United States Patent
Ivantysynova et al.

(10) Patent No.: US 7,896,125 B2
(45) Date of Patent: Mar. 1, 2011

(54) HYDRAULIC STEERING DEVICE FOR VEHICLES

(75) Inventors: Monika Ivantysynova, West Lafayette (IN); Jürgen Weber, Dresden (DE); Jörg Grabbel, Hamburg (DE)

(73) Assignee: CNH Baumaschinen GmbH, Berlin (DE)

( * ) Notice: Subject to any disclaimer, the term of this patent is extended or adjusted under 35 U.S.C. 154(b) by 741 days.

(21) Appl. No.: 10/535,125

(22) PCT Filed: Nov. 6, 2003

(86) PCT No.: PCT/DE03/03677

§ 371 (c)(1), (2), (4) Date: Jan. 6, 2006

(87) PCT Pub. No.: WO2004/050456

PCT Pub. Date: Jun. 17, 2004

(65) Prior Publication Data
US 2006/0162988 A1    Jul. 27, 2006

(30) Foreign Application Priority Data
Dec. 3, 2002 (DE) ............... 102 56 307

(51) Int. Cl.
*B62D 5/06* (2006.01)
(52) U.S. Cl. .......... 180/418; 180/6.3; 180/419; 180/420
(58) Field of Classification Search ............ 180/6.3, 180/618, 425, 418–420
See application file for complete search history.

(56) References Cited

U.S. PATENT DOCUMENTS

| | | | | |
|---|---|---|---|---|
| 2,265,854 A | * | 12/1941 | Ostermann ............. | 105/36 |
| 2,595,594 A | * | 5/1952 | Martin ............. | 180/266 |
| 3,014,734 A | * | 12/1961 | Swenson ............. | 280/638 |
| 3,326,317 A | * | 6/1967 | Marquardt ............. | 180/420 |
| 3,904,042 A | * | 9/1975 | Colston ............. | 414/1 |
| 3,939,933 A | * | 2/1976 | Armstrong ............. | 180/53.8 |
| 4,147,262 A | * | 4/1979 | Umeda et al. ............. | 414/687 |
| 4,313,615 A | * | 2/1982 | Simon ............. | 280/432 |
| 4,820,480 A | * | 4/1989 | David ............. | 418/153 |
| 5,076,378 A | * | 12/1991 | Lagace ............. | 180/9.1 |
| 5,355,743 A | * | 10/1994 | Tesar ............. | 74/490.03 |
| 5,529,136 A | * | 6/1996 | Zulu ............. | 180/6.44 |
| 5,584,346 A | * | 12/1996 | Sakamoto et al. ............. | 172/4.5 |
| 5,653,304 A | * | 8/1997 | Renfroe ............. | 180/402 |
| 6,039,133 A | * | 3/2000 | Zulu ............. | 180/6.64 |
| 6,604,351 B2 | * | 8/2003 | Dillon ............. | 56/14.6 |
| 6,668,967 B2 | | 12/2003 | Sorensen et al. | |
| 6,719,377 B1 | * | 4/2004 | Zimmermann et al. ... | 303/115.4 |

(Continued)

FOREIGN PATENT DOCUMENTS
DE     2161456     6/1973

(Continued)

*Primary Examiner*—Lesley Morris
*Assistant Examiner*—Maurice Williams
(74) *Attorney, Agent, or Firm*—Patrick M. Sheldrake; Michael G. Harms

(57) ABSTRACT

A hydraulic steering device for vehicles, especially construction machines, with which is simple and robust mechanically and can be precisely controlled, without possessing the disadvantages of the current state of the art. A hydraulic swivelling motor for producing the steering motion, which is connected to a variable flow rate pump with reversal of its direction of delivery.

19 Claims, 6 Drawing Sheets

U.S. PATENT DOCUMENTS

| | | | |
|---|---|---|---|
| 7,331,411 B2 * | 2/2008 | Shevket | 180/6.3 |
| 2002/0170769 A1 * | 11/2002 | Sakaki et al. | 180/441 |
| 2003/0013575 A1 * | 1/2003 | Sprinkle et al. | 477/120 |
| 2003/0103850 A1 * | 6/2003 | Szulczewski | 417/319 |
| 2004/0096334 A1 | 5/2004 | Aldinger et al. | |

FOREIGN PATENT DOCUMENTS

| | | |
|---|---|---|
| DE | 2903624 | 8/1980 |
| DE | 3730045 | 3/1989 |
| EP | 0266785 | 5/1988 |

* cited by examiner

HYDRAULIC STEERING DEVICE FOR VEHICLES

BACKGROUND OF THE INVENTION

The invention concerns a hydraulic steering device for vehicles, in particular construction machines.

Hydraulic steering devices are known in a multitude of forms and are widespread. Usually, a linear cylinder is employed in combination with steering rods in order to bring the wheels to be controlled into the desired steering angle. For controlling the linear cylinder, arrangements of control valves and other components are usual, which assure a precisely defined flow of pressure medium into the cylinder.

A particular system of pumps for a hydraulic steering device is disclosed in DE 101 04 851 A1. This system includes of a vane pump that possesses a controllable pumping capacity and hence can provide a variable flow of pressure medium for the steering device. On this pump the pumping capacity is varied by means of a movable curved ring, the position of which is determined by an electric motor. A controller measures the current position of the curved ring and from this generates the necessary positioning signals for the electric motor. Because of its construction, this vane pump can, of course, produce only moderate maximum pressures and is therefore not suitable for all types of hydraulic steering actuators.

Additional known hydraulic steering systems possess a series of disadvantages. The use of linear cylinders is unsuitable, particularly for articulated vehicles, since they can be damaged in rough working environments. Furthermore, the necessary mechanism is expensive in construction.

The valve arrangements necessary for the steering device are likewise very expensive. Various hydraulic components generally combined in a servostat comprise different hydraulic elements, usually, a rotor unit which is mechanically connected with the steering valve, a pressure relief valve for high-pressure protection, non-return valves and some further valves in order to assure a supply of pressure medium to the steering unit under all operating conditions. The steering device must function always, even in emergency situations and with the main engine switched off, so that usually in addition an emergency pressure supply is available, e.g. an electric motor or something similar is provided. The throttling edges in the valves have inherent pressure losses, which reduce the efficiency of such an arrangement. Electro-hydraulic controls for the steering device, in which mechanical actuation of the rotor unit in the servostat can be dispensed with, are very expensive with these solutions, as complicated electro-hydraulic valve arrangements must be employed.

It would be a significant advantage to provide a hydraulic steering device for vehicles that overcomes the various problems and difficulties described above.

SUMMARY OF THE INVENTION

It is, therefore, an object of the present invention to provide a hydraulic steering device for vehicles which is characterised by simple and robust mechanics and can be precisely controlled without having the disadvantages of the current state of the art.

It is another object of the present invention to provide a hydraulic swivelling motor directly converts the flow of pressure medium from the pump into a rotational motion of the steering device.

It is another object of the present invention to provide an a hydraulic steering device of the type described above it is achieved in this way that this possesses a hydraulic swivelling motor for producing the steering movement, which is combined with a reversal of the direction of delivery in a pump with variable out-put.

It is another object of the present invention to provide a hydraulic steering device with a swivelling motor, formed as the articulation of an articulated vehicle or arranged in and/or on an articulation.

It is another object of the present invention to provide a hydraulic steering device with at least one swivelling motor arranged above and/or below the central pivot joint.

It is a still further object of the present invention to provide a hydraulic steering device with a swivelling motor formed as a swivelling vane motor with at least two movable vanes.

It is an even still further object of the present invention to provide a hydraulic steering device employing a pump with an electronic control device, in particular, a micro controller.

It is a further object of the present invention to provide a hydraulic steering device using a joystick, possibly with a force-feedback function, for setting the steering angle.

These, and other, objects are achieved by providing a hydraulic steering device for vehicles, especially construction machines with which is simple and robust mechanically and can be precisely controlled, without possessing the disadvantages of the current state of the art. A hydraulic swivelling motor for producing the steering motion, which is connected to a variable flow rate pump with reversal of its direction of delivery.

DESCRIPTION OF THE DRAWINGS

Further objects of the invention together with additional features contributing thereto and advantages accruing therefrom will be apparent from the following description of the preferred embodiment of the invention which is shown in accompanying drawings with like reference numerals indicating corresponding parts throughout, wherein.

DESCRIPTION OF THE PREFERRED EMBODIMENT

Figure 1:
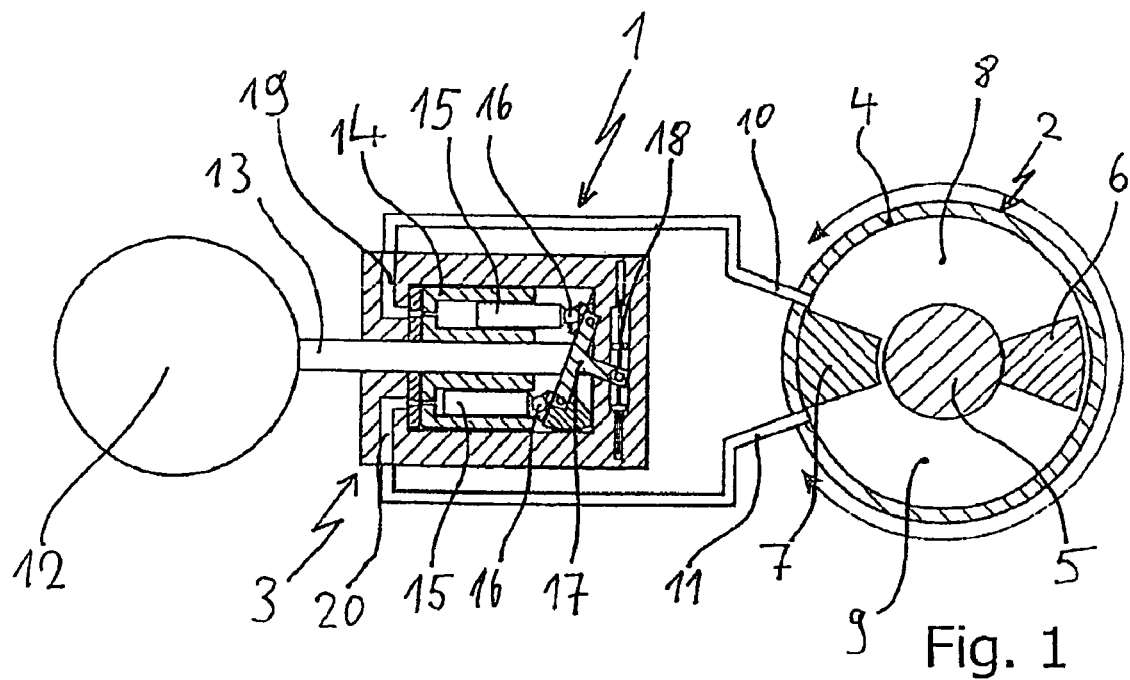
FIG. 1 is a diagrammatic view of a steering mechanism in accordance with the invention.

In general, the objects are achieved by a hydraulic swivelling motor for producing the steering motion, which is connected to a variable flow rate pump with reversal of its direction of delivery. The a hydraulic steering device to be described herein uses a hydraulic swivelling motor for producing the steering movement, which is combined with a reversal of the direction of delivery in a pump with variable output.

A hydraulic swivelling motor directly converts the flow of pressure medium from the pump into a rotational motion of the steering device. Thus, it is suitable for employment in steering systems, since movements occurring here are rotational movements. Therefore, expensive steering rods and such-like can be omitted, in order to convert the linear movements of a hydraulic cylinder into an appropriate rotational motion of the axle wheels to be steered and/or vehicle parts. Swivelling motors are extremely robust, as the parts to be moved are situated in a casing closed to the outside, from which only the rotating axle projects.

The application of a pump with a variable volume flow with reversal of the direction of flow avoids any pressure losses at the throttle edges in valves, as these are omitted from the performance circle. In addition, a variable pump possesses rapid response behaviour and a precise regulation of the volume flow, which is important for use in steering devices. As the pump is able to deliver volume flows in both directions, it enables the omission of every control valve in the hydraulic circuit, which hence must have merely the standard safety valves. At the same time the pump can be connected to a central engine with further consumers or have its own drive unit as a result of which functioning steering can be guaranteed under all operating conditions of the vehicle. For emergency operation a second pump driven by an electric motor can be provided.

Thus it can be envisaged that pumps which are variable in their flow rate with reversal of their flow direction can be designed as constant flow pumps, which are driven by a variable speed electric motor. Alternatively, it can be envisaged that the pump that is variable in its flow rate with reversal of the flow direction can be designed as a pump with a variable displacement volume, in particular as a variable displacement axial piston pump with swash plate.

These two embodiments of a pump with a variable flow rate offer according to their purpose of use a particularly favourable possibility to provide the necessary volume flow for the steering device. The use of the electrically driven fixed displacement pump renders possible one of the other steering hydraulic systems which is independent of the other hydraulic system which is possibly present in the vehicle. In vehicles in which a higher ranking power management system is employed in combination with a further hydraulic system, the use of the displacement-controlled pump is sensible, which in this case for example is driven by the central engine of the vehicle.

In one embodiment of the steering system it is envisaged that the swivelling motor is formed as the articulation of an articulated vehicle or is arranged in and/or on an articulation. With articulations on vehicles the front and the rear parts of the vehicle turn relative to each other on an axle of rotation, as a result of which travelling in a curve is achieved. A swivelling motor arranged on this axle can then directly determine the angle between the front and rear parts of the vehicle. In addition it can also assume the functions of a bearing, so that a single unit made up of the joint and swivelling motor is formed. Steering cylinders fixed on the outside and hence exposed to the danger of destruction are omitted completely.

A particular embodiment of the device provides that at least one swivelling motor is arranged above and/or below the central pivot joint.

To increase the possible steering torque or reduce the size of the individual swivelling motors it is possible to fix several motors on the turning axle. At the same time in addition to a motor arranged possibly within the joint further swivelling motors could be arranged on the same axle above or below the joint. As the maximum steering torque results from the total volumes of all the motors working together, thus an optimum ratio of size to the possible steering torque is achieved.

A further embodiment of the steering system is characterised in that the swivelling motor is formed as a swivelling vane motor with at least two movable vanes. Swivelling vane motors with one vane have a range of angle of rotation of about 270 degrees. Since for steering systems as a rule an angle of less than 135 degrees is necessary, a swivelling vane motor with two movable vanes can be employed. This offers the advantage of making possible a uniform coupling of power to the rotating axle, as well as requiring only about half of the size of the single-vane motor for the same steering torque.

In an embodiment of the invention it is envisaged that for the pump control an electronic control device, in particular a micro controller is provided. By means of an electronic controller the many and diverse control problems of the technical task for the steering device can be solved centrally. The use of a micro controller makes possible the utilisation of different programs and a flexible and economical implementation of the controller and permits coupling with further vehicle components, which facilitates integration of the steering system into an over-all vehicle concept. It can be advantageous if sensors for recording the steering angle and/or further system state parameters are provided. With this the control of the steering can be expanded to a controller. Through the recording of the steering angle this can be controlled and hence a clearly higher steering precision can be obtained than with a purely steering concept. With the recording of further system state parameters, such as for example the pump speed, the hydraulic pressure or the vehicle's travelling speed a further increase in steering precision can be achieved and a dependence of the steering behaviour on for example travelling speed can be achieved.

A further embodiment of the steering device is characterised in that for setting the steering angle an electronic operating element, in particular a joy-stick, possibly with a force-feedback function is provided. Through dispensing with mechanical steering components a transition to a completely electro-hydraulic vehicle is possible. In doing so the actual mechanical steering wheel with a direct mechanical coupling to the steering device is replaced by an electronic set value transducer. Through this then, only as an example in the form of a joystick deflection, the desired steering motion is preset and passed on electronically to the steering control unit, which converts this into the mechanical motion of the steering motor by influencing the pump displacement volume. Thus, a series of additional safety functions can be implemented, which for example prevent too violent steering turns when travelling fast and nevertheless allow a rapid steering behaviour when travelling slowly. The necessary physical strength of the driver for operating the vehicle is likewise reduced significantly. Through the use of force-feedback a direct haptic (tactile) signalling of the current state of the vehicle in relation to the operator is achieved. Apart from unsafe vehicle states, which could be indicated to the driver, the vehicle behaviour altered by the various control programmes is displayed directly to the driver.

A further embodiment of the steering device in accordance with the invention consists in that a known linear cylinder system is provided as the steering motor. The use of control systems in combination with the variable flow pump is advantageous also for a version with a linear cylinder. In particular the enhanced safety functions and improved operation, which are associated with these modern systems, offer also advantages over conventional steering geometry. The process in accordance with the invention for controlling a steering mechanism is characterised in that a set angle determined by the operator is recorded, and depending upon it, the quantity and direction of the volume flow to the steering motor is influenced.

It could be advantageous that in addition the actual angle of the steering gear is recorded and the volume flow to the steering motor is regulated in accordance with a control algorithm which is dependent upon the operating state of the vehicle, in particular a steering angle control and/or a steering angle speed control. This process makes possible the already-described electro-hydraulic vehicle steering. In doing so the operator sets the steering angle to be used through an electronic control element, which then elicits the steering deflection through the corresponding volume flow to the steering motor. Steering precision can be increased, if in addition the actual angle of the steering gear is recorded and then influenced by regulation of the volume flow in such a way that the set steering angle is attained. Through an adjustment of the control algorithm, depending upon the current state of the vehicle, different characteristics of the steering gear can be obtained. For example an increase in the response characteristic of the steering gear when travelling slowly is imaginable or a dynamic changeover to steering angle velocity control for evasive manoeuvres in emergency situations.

The steering system in accordance with the invention shown in FIG. 1 and designated generally by 1 consists essentially of a hydraulic swivelling motor 2 and a variable flow pump 3 with reversal of the direction of flow.

Swivelling motor 2 this uses a cylindrical outer casing 4 and a central rotatable axle 5. On the axle 5, a swivelling vane 6 is attached, which is sealed outwardly against the wall of the casing 4. A vane 7, fixed solidly to the outer wall 4, fits sealed to the axle 5 of rotation. By means of the fixed vane 7, the axle 5 and the rotating vane 6 attached to it the interior of the casing 4 is divided into two chambers, 8 and 9. Each of the chambers 8 and 9 is connected to the hydraulic circuit via a hydraulic channel 10 and 11, respectively.

If pressure medium is pumped through channel 10 into chamber 8 and the same quantity of pressure medium is withdrawn from chamber 9 through channel 11, then because of the equally large and opposing change in volume in the two chambers 8 and 9 the axle 5 is set into rotation by the vane 6, so that a rotational motion of the axle arises dependent upon the flow of pressure medium. This can go so far, maximally, until the volume of one of the two chambers is reduced to zero and the movable vane 6 presses tightly against one side or the other of the fixed vane 7.

The hydraulic pump 3 is executed as an axial piston construction. The central shaft 13 of the pump is set into rotation by an engine 12. This drives a cylinder block 14, in which a number of pistons 15 are arranged movably in a pitch circle about the axle. These pistons 15 abut with their free ends 16 against a disc 17, as a result of which on rotation of the cylinder block 14 with an oblique arrangement of the disc 17 a reciprocating motion of the pistons 15 is produced. On moving the piston 15 out from the inner to the outer top dead centre pressure fluid is sucked from the connection 19 and on moving from the outer to the inner top dead centre pressure fluid is conveyed to the connection 20.

If the disc 17 is now adjusted in its inclination by a control actuator 18, that leads to a change in the reciprocating movement of the piston 15, which causes a change in the displacement volume of the pump. When the oblique disc 17 allows outward movement in both directions from the neutral position, in which it is perpendicular to the axis of rotation 13, the delivery direction of the pump is reversible and it can suck fluid from connection 20 and deliver it to connection 19. The delivery volume is always dependent upon the angle of the disc 17 and can be varied smoothly from the neutral position, at which no pressure medium is delivered, up to a maximum in each of the two delivery directions, at which the disc 17 possesses its maximum set angle to the axle 13.

Figure 2:
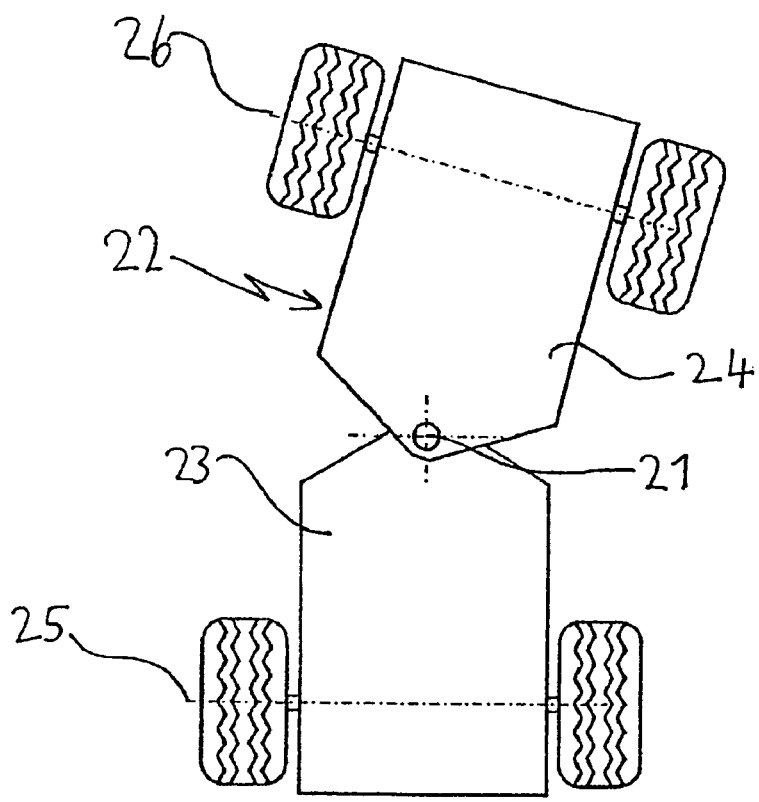
FIG. 2 a diagrammatic plan view of an articulated vehicle.

The swivelling motor 2 is installed on the articulation 21 of an articulated vehicle 22, as depicted in FIG. 2. In doing so the casing 4 of the swivelling motor 2 is connected rigidly to one part 23 of the vehicle and the rotation axle 5 is connected rigidly to the other part 24 of the vehicle. The turning motion of the axle 5 produced by the conveyance of pressure medium to and from the connections 10 and 11 of the swivelling motor 2 produces an articulation of one half of the vehicle 24 relative to the other half of the vehicle 23. The angle between the two axles 25 and 26 of the vehicle resulting thereby leads to travel in a curve, the radius of which is smaller the further the axle 5 in motor 2 is turned.

Figure 3:
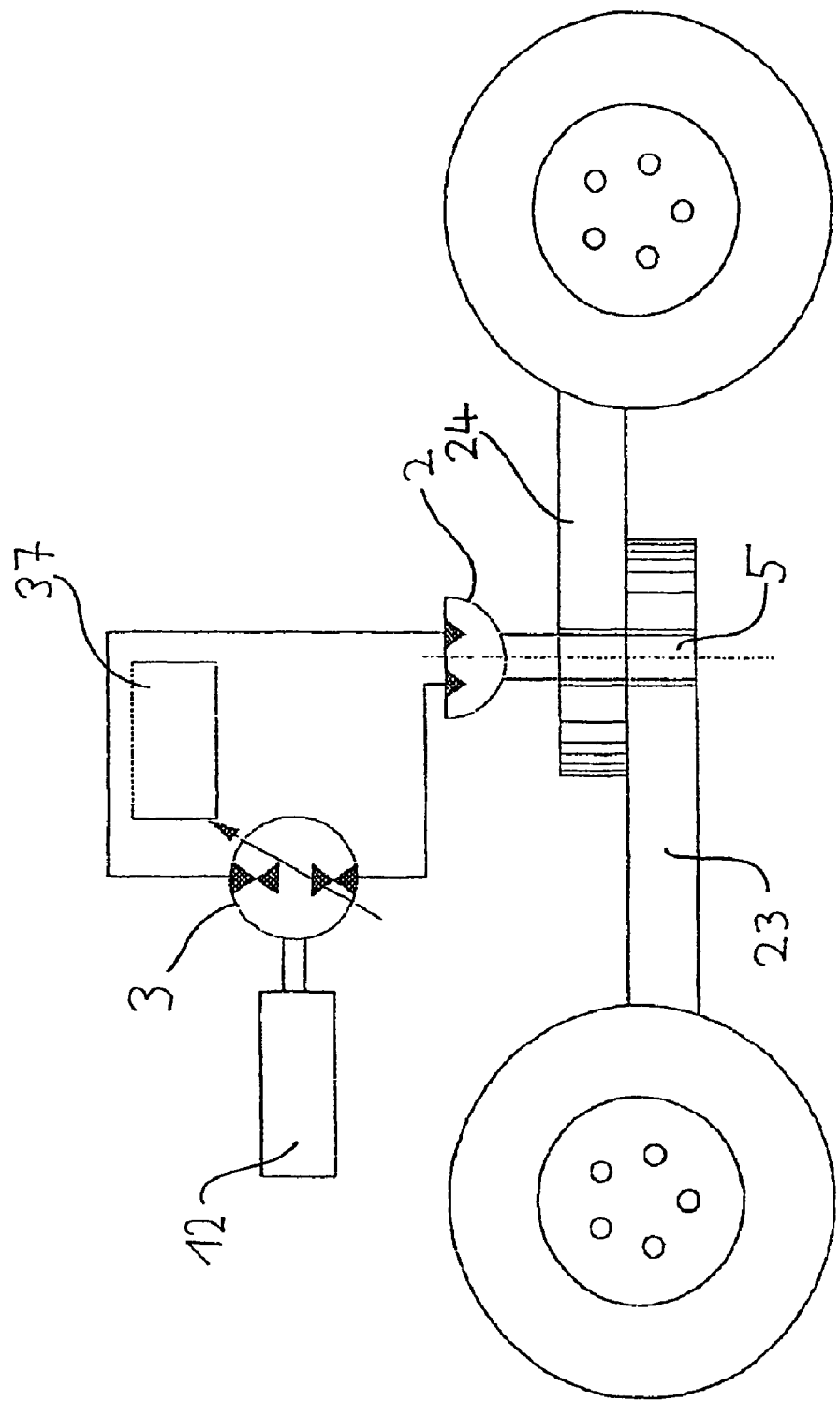
FIG. 3 a diagrammatic side view of an articulated vehicle.

In FIG. 3 yet again the production of the steering movement is explained diagrammatically. The variable flow rate pump 3 driven by the engine 12 delivers a volume flow to the swivelling motor 2, which is determined by a higher-ranking controller of the electrohydraulic regulator, which results in a turning movement of the axle 5. This leads to initiating a steering movement between the two parts of the vehicle 23 and 24.

Figure 4:
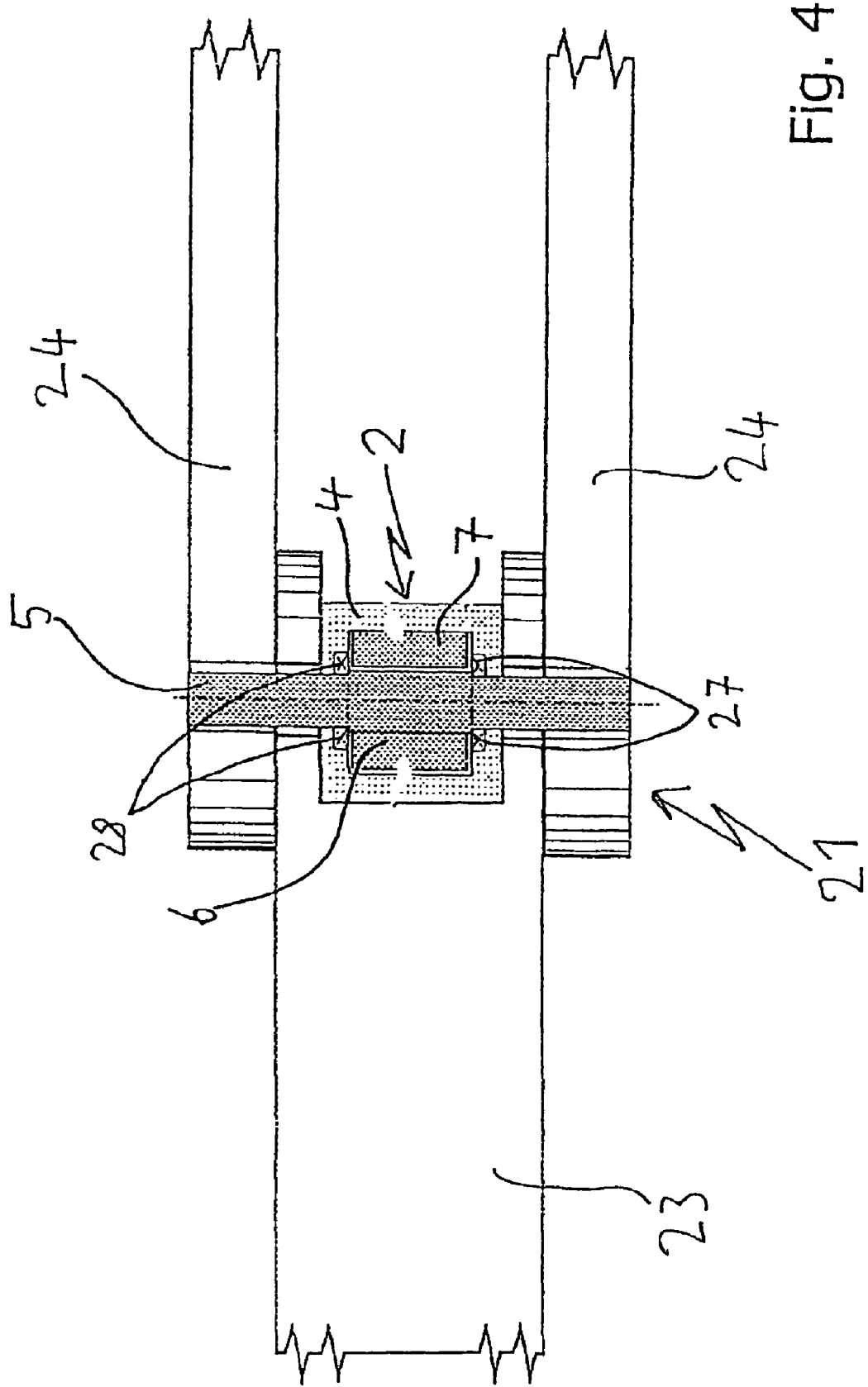
FIG. 4 a side view of an articulation (partly cut away)

The swivelling motor 2 can also be built into the articulated joint 21 itself, as explained in more detail in FIG. 4. The turning axle 5 rigidly joined to one part of the vehicle 24 runs through the swivelling motor 2 located in the joint. This with its casing 4 is rigidly joined to the other part 23 of the vehicle. At the same time the bearing points 27 and 28 of the swivelling motor 2 can themselves form the turning bearing between the two parts of the vehicle 23 and 24, which leads to a very compact construction of the joint.

Figure 5:
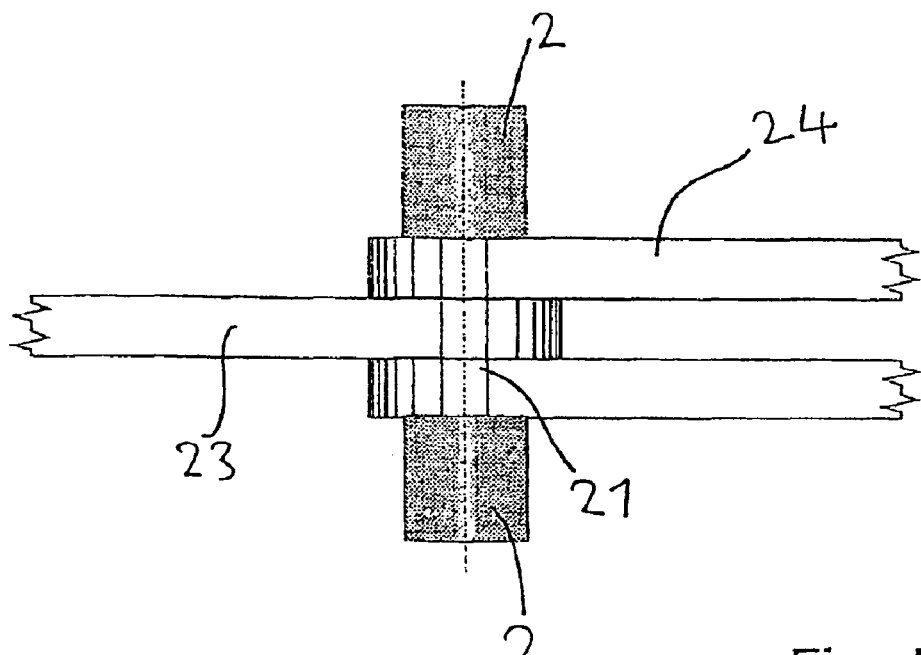
FIG. 5 a side view of an articulation with two swivelling vane motors.
Figure 6:
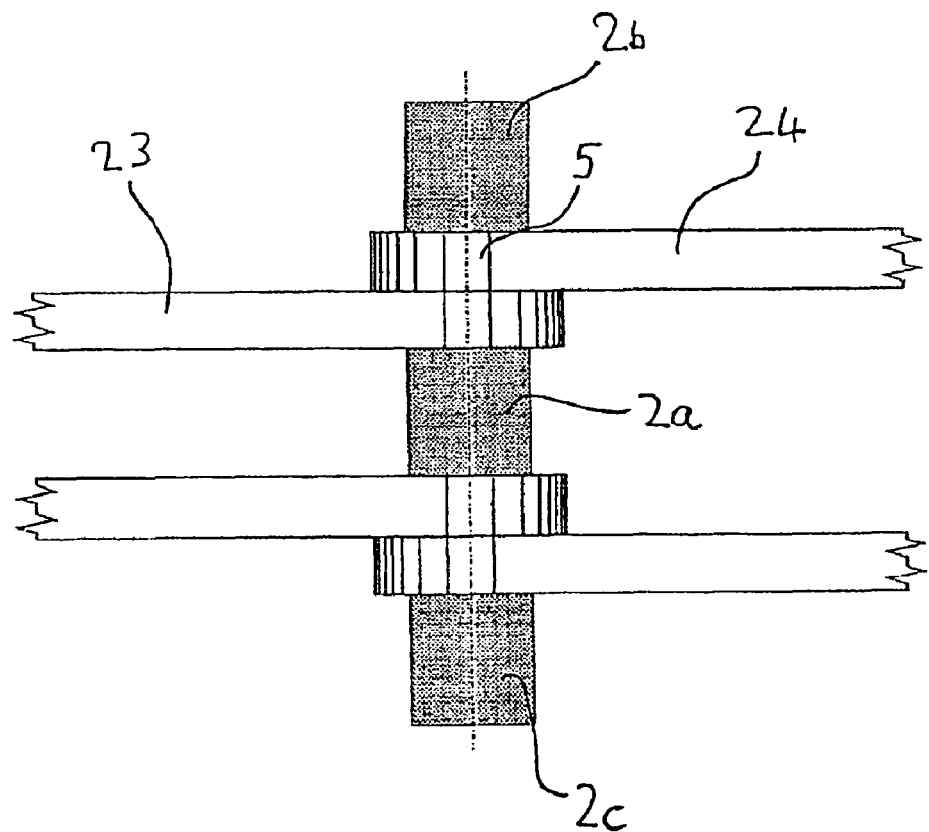
FIG. 6 a side view of an articulation with three swivelling vane motors.

Alternatively, the swivelling motors 2 can also be arranged above or below the articulation joint 21 between the parts of the vehicle 23 and 24, as shown in FIG. 5. Through the use of two motors the maximum steering torque can be increased and/or the size of the two motors 2 can be reduced. An embodiment, in which three swivelling motors 2a, 2b, and 2c serve to further increase the maximum steering torque between the two vehicle parts 23 and 24, is shown in FIG. 6. For this apart from the motor 2a arranged in the joint two further motors 2b and 2c are attached above or below the joint. These together drive the rotation axle 5 and are rigidly connected to the vehicle parts 23 and 24 respectively. In doing so care must be taken through the correct assignment of the connections 10 and 11 to the hydraulic circuit that the transfer of power by the motors occurs in the same direction.

Figure 7:
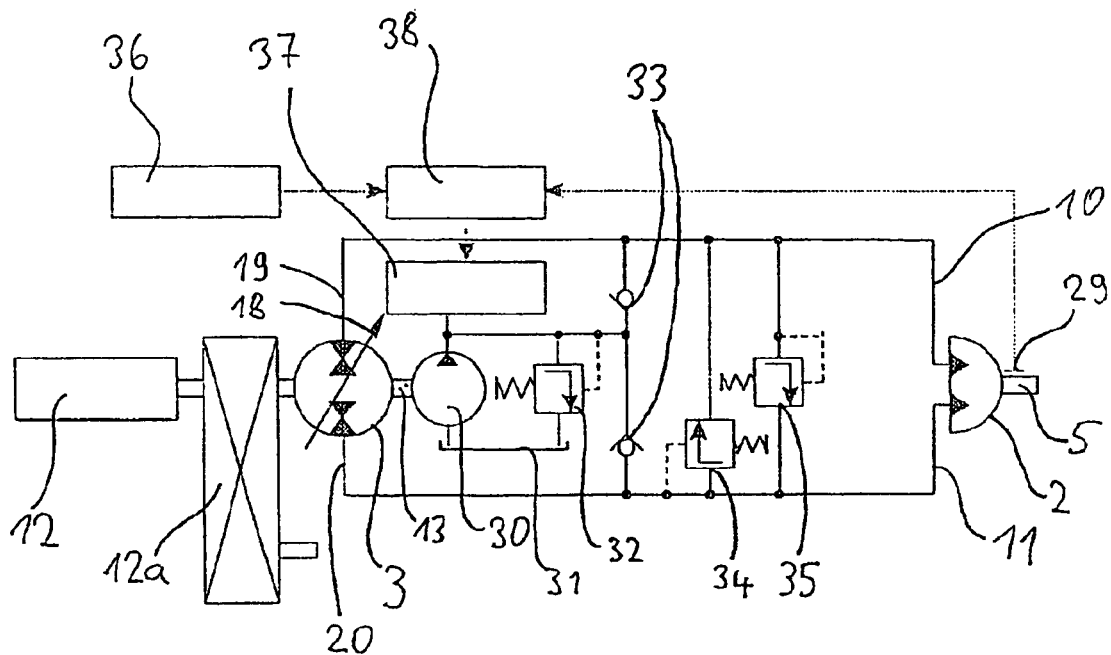
FIG. 7 a diagrammatic circuit plan of the steering device in a closed control circuit.

One embodiment of the displacement controlled hydraulic steering system is depicted in FIG. 7. An engine 12 drives via a gearbox 12a the hydraulic pump 3, which is variable in flow rate and delivery direction. On the same driving shaft 13 there is likewise a further non-variable smaller hydraulic pump 30, which sucks hydraulic fluid from a reservoir 31 and supplies it to a low pressure circuit protected by a pressure relief valve 32. This is connected with the high-pressure circuit via two non-return valves 33, which possesses two pressure relief valves 34 and 35 to protect the user.

The two connections 19 and 20 of the variable pump 3 are directly connected with the two unions 10 and 11 of the swivelling vane motor 2. Every change at the adjusting actuator 18 of the pump 3 thus brings about a hydraulic flow from the connection 19 of pump 3 via the connection 10 of the motor 2 in one of its chambers and an equally large outflow of hydraulic fluid from the other chamber of the motor 2 via connection 11 to the second connection 20 of pump 3. Thus, directly through the change in the adjusting actuator 18 of the pump a steering movement at the axle 5 is induced.

Figure 8:
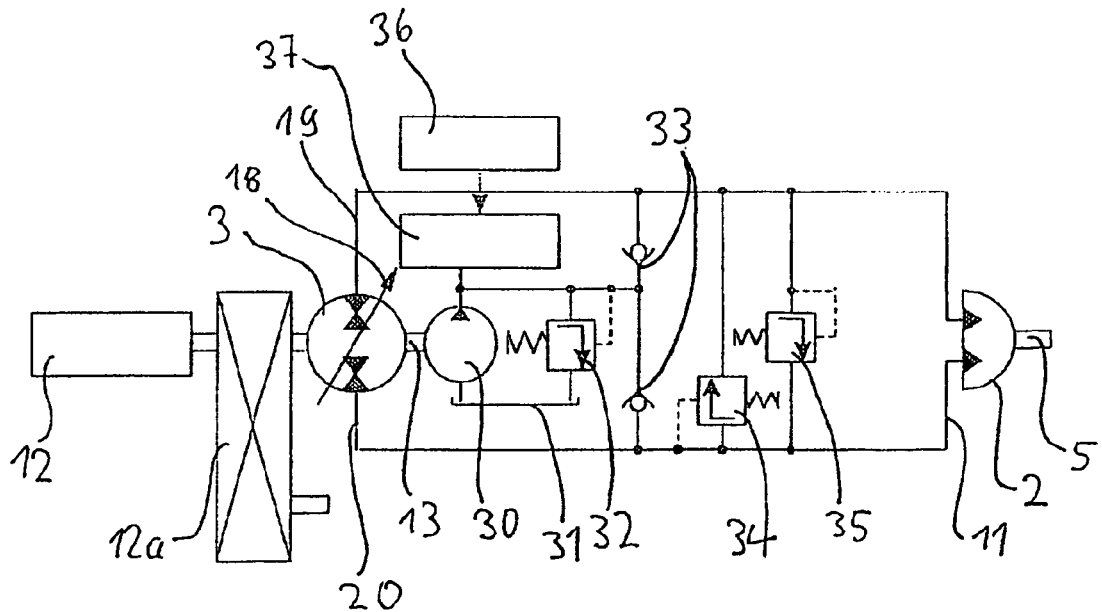
FIG. 8 a diagrammatic circuit plan of the controlled steering device.

In operation of the steering device depicted in FIG. 8, a setting signal is preset by the operator 36, which is converted in such a way by the electro-hydraulic adjusting unit 37 of the pump, that a corresponding displacement volume and the required direction of delivery flow of the pump 3 is set and as a result the required volume flow is produced at the appropriate connections of the swivelling motor. This corresponds in this simple form to a steering angle velocity control, as through the setting of the delivery volume of the pump 3 the speed of the steering movement is determined. Thus, the operator can by means of a large setting signal induce a rapid steering movement at the axle 5 and through a small setting signal induce a small steering movement. At the same time the steering signal prescribes the direction of the steering movement. If the actual position of the axle 5 is measured by means of a position sensor 29, this signal can be utilized by a controller 38, in order to produce a closed control circuit, as depicted in FIG. 7. In doing so the setting signal of the operator 36 in combination with the current position of the axle measured by the sensor 29 and an appropriate setting signal for the variable pump 3 is produced. Thus, on the one hand a steering angle control is achieved, in which the operator determines through his steering movement the actual position of the steering device, and on the other hand a steering angle speed control, in which the measurement signal from 29 is differentiated, with which the rotational speed of axle 5 can be controlled.

At the same time the controller 38 can produce various different steering characteristics, in which depending upon further measure measured operating conditions of the vehicle and the steering settings of the operator 36 the adjusting signals for the electro-hydraulic actuator 37 are produced. Thus the steering characteristics of the vehicle can be adapted to the vehicle condition.

Figure 9:
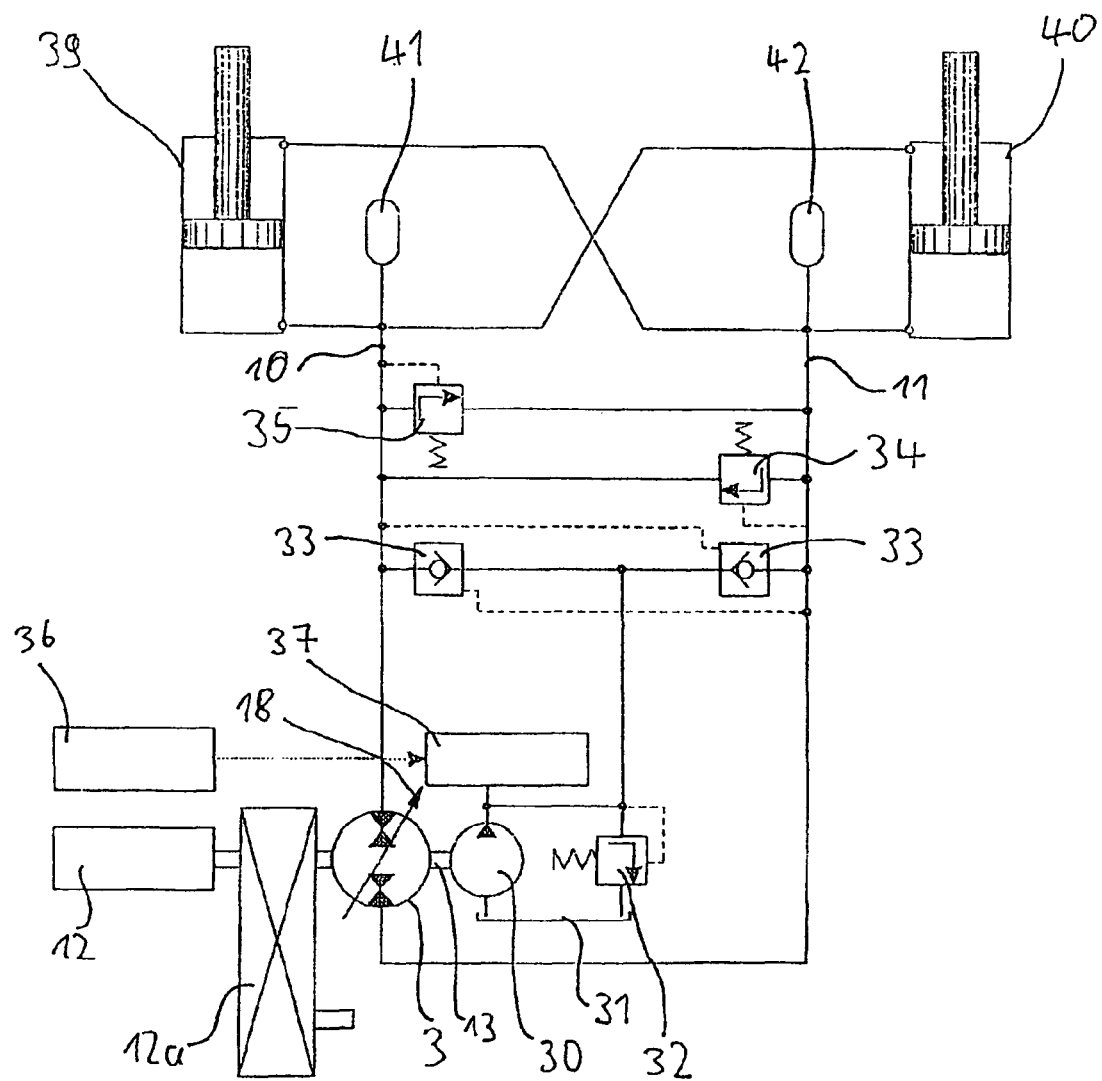
FIG. 9 the circuit diagram of the steering device in accordance with the invention with differential cylinder steering.

Operation of the controller in accordance with the invention with a conventional differential cylinder actuator is depicted in more detail in FIG. 9. At the same time the construction of the hydraulic circuit is essentially analogous to the one above. Of course instead of the swivelling motor 2 a conventional steering actuator consisting of two differential cylinders 39 and 40 is connected. At the same time the cylinders 39 and 40 are arranged essentially between the two halves of the vehicle 23 and 24 on both sides of the articulation joint 21, so that through the inward movement of one cylinder 39 on one side and the outward movement of the other cylinder 40 on the other side a corresponding moment is applied to the halves of the vehicle, which leads to rotation about the joint 21.

Determined by the different volumes of the two halves of the differential cylinders 29 and 40 and hence because the inwards and outwards movements of the two cylinders are not equal, of course difference volumes occur in the actuator circuit. These are equalised on the one hand by the pilot-controlled non-return valves 33 in the low-pressure circuit and can on the other hand flow into two hydraulic reservoirs 41 and 42, which must be provided for this purpose on such differential cylinder steering systems. Here, too, a controller in the open control circuit is depicted, in which the operator 36 prescribes an appropriate control signal, by which the displacement volume of pump 3 is varied by means of an electro-hydraulic adjusting unit 37, in order to produce an appropriate flow to and from the differential cylinders. With an appropriate measurement of the angle in the articulated joint between the two halves of the vehicle here too operation in the closed control circuit can be implemented.

Naturally the invention is not limited to the preceding example embodiment, but can be modified in many ways, without departing from the basic idea. For example hydraulic swivelling motors can be used also for non-articulated vehicles. Furthermore, neither the number nor the size of the motors is limited to the embodiments shown. In addition, pumps which are variable as regards flow rate and direction of delivery, and also constant delivery pumps driven by variable speed electric motors can be employed. Furthermore, control algorithm can be modified in many different ways, in order to achieve a desired steering behaviour for each vehicle. Integration into the overall vehicle-control concept and something similar is naturally is also possible.

Having thus described the invention, what is claimed is:

1. A hydraulic steering device for centre pivot steered vehicles with a centre point steering joint between major ground-engaging components of the vehicles, comprising:
   at least one hydraulic swiveling motor for producing the steering movement;
   a hydraulic variable flow pump with reversal of the direction of delivery, the variable flow pump in fluid flow communication with the at least one swiveling motor;
   the at least one swiveling motor further being a swiveling vane motor that is in the form of a centre pivot steering joint of the centre point-steered vehicle or is arranged in the rotary axis of the centre point steering joint of the vehicle, the at least one swiveling motor having at least one first vane fixed in relation to the first ground-engaging component, and at least one moveable vane fixed in relation to the second ground-engaging component and wherein the at least one moveable vane pivots about the rotary axis with respect to the first ground engaging component
   wherein two connections of the variable flow pump are connected with two chambers of the swiveling vane motor in a first circuit such that a chance at the adjusting actuator of the variable flow puma causes an inflow to one of the chambers and an outflow from the other chamber; and
   the variable flow pump driven by a driving mechanism that powers a second hydraulic pump located in a second circuit configured to draw fluid from a reservoir for supplying the second circuit wherein at least one valve permits the flow of fluid from the second circuit to supply the first circuit.

2. The steering device of claim 1, wherein: the variable flow pump with reversal of its delivery direction is also a constant displacement pump, and configured to be drivenly coupled to a controlled variable speed electric motor.

3. The steering device of claim 1, wherein: the variable flow pump with reversal of its delivery direction is a variable displacement axial piston pump with a swashplate, wherein the position of the swashplate with respect to pistons of the pump controls the direction and displacement of the pump.

4. The steering device of claim 1, wherein: at least one additional swiveling motor is arranged on an opposite side of the centre point steering joint from the at least one swiveling motor, wherein both motors are located along the rotary axis.

5. The steering device of claim 2, wherein: the at least one swiveling motor is arranged above and/or beneath the centre point steering joint along the rotary axis.

6. The steering device of claim 1, wherein: first and second chambers are arranged directly connected to the chambers of the pump such that running the pump in a first direction delivers a pressure to the first chamber steering the vehicle in a first direction and running the pump in a second direction delivers a pressure to a second chamber for steering the vehicle in a second direction.

7. The steering device of claim 1, further including: an electronic controller connected to and controlling the direction and displacement of the pump.

8. The steering device of claim 7, wherein: the electronic controller is configured to receive a steering signal from the operator, wherein the controller is configured to convert the signal to a corresponding displacement volume and either the first or second'direction of flow of the pump, and transmit a signal to an adjusting actuator connected to the swashplate, to change the swashplate to a position corresponding to the determined displacement volume and direction.

9. The steering device of claim 2, further including: sensors configured to record steering angle and further system parameters of state are positioned on the at least one motor.

10. The steering device of claim 3, further including: sensors configured to record the steering angle and further system parameters of state are positioned on the at least one motor.

11. The steering device of claim 7, further including: sensors for recording the steering angle and further system parameters of state are positioned on the at least one motor.

12. The steering device of claim 7, further including: a joystick connected to said electronic control element for setting the steering angle of the vehicle.

13. The steering device of claim 12, wherein the joystick includes a force-feedback function.

14. The steering device of claim 11, further including: a joystick connected to said electronic controller for setting the steering angle.

15. The steering device of claim 14, wherein the joystick includes a force-feedback function.

16. The steering device of claim 11, further including: a set angle prescribed by the operator is recorded in the micro-processor, and depending upon that the quantity and direction of the volume flow to the at least one hydraulic steering motor is influenced.

17. The steering device of claim 16, wherein: the actual angle of the steering device is recorded in the micro-processor and the volume flow to the steering motor is controlled by a control algorithm which is selectively variable depending upon the operating state of the vehicle, in particular a steering angle control and/or a steering angle velocity controller.

18. The steering device of claim 1, wherein:
the swiveling motor is positioned inside of the joint such that a turning axle rigidly connected to the first ground engaging component of a vehicle runs through the swiveling motor that is rigidly mounted to a second part of the vehicle and bearing points of the swiveling motor form a turning bearing between the first and the second ground engaging component of the vehicle.

19. A hydraulic steering device for centre pivot steered vehicles with a centre point steering joint between major ground-engaging components of the vehicles, comprising:
at least one hydraulic swiveling motor for producing the steering movement;
a hydraulic pump with a variable flow rate and reversal of the direction of delivery, the pump in fluid flow communication with the at least one swiveling motor;
the at least one swiveling motor further being a swiveling vane motor that is in the form of a centre pivot steering joint of the centre point-steered vehicle or is arranged in the rotary axis of the centre point steering joint of the vehicle the at least one swiveling motor having at least one first vane fixed in relation to the first ground-engaging component and at least one moveable vane fixed in relation to the second ground-engaging component and wherein the at least one moveable vane pivots about the rotary axis with respect to the first ground engaging component;
wherein two connection of the hydraulic pump with a variable flow rate are directly connected with two unions of the swiveling vane motor in a first circuit such that every change at an adjusting actuator of the pump causes an inflow to one of the unions and an outflow from the other union; and
the hydraulic pump with a variable flow rate and reversal of the direction of delivery mechanically by a driving mechanism that powers a second hydraulic pump located in a second circuit configured to draw fluid from a reservoir for supplying the second circuit, wherein at least one check valve permits the flow of fluid from the second circuit to the first circuit.

* * * * *